United States Patent [19]

Rowlette

[11] 4,250,140

[45] Feb. 10, 1981

[54] METHOD AND COMPOSITION FOR RETARDING WATER EVAPORATION

[75] Inventor: John J. Rowlette, Arcadia, Calif.

[73] Assignee: Duane D. Erway, South Pasadena, Calif.; a part interest

[21] Appl. No.: 33,975

[22] Filed: Apr. 27, 1979

Related U.S. Application Data

[62] Division of Ser. No. 444,827, Feb. 22, 1974, Pat. No. 4,162,990.

[51] Int. Cl.³ .............................................. B01J 1/18
[52] U.S. Cl. ...................................... 422/43; 252/383; 252/384; 252/381
[58] Field of Search ...................... 252/383, 384, 381; 422/43

[56] References Cited

U.S. PATENT DOCUMENTS

| | | | |
|---|---|---|---|
| 2,797,139 | 6/1957 | Veatch | 422/43 |
| 3,391,987 | 7/1968 | Myers | 252/384 |
| 3,450,488 | 6/1969 | Dressler | 252/381 |
| 3,531,239 | 9/1970 | Rowlette | 252/383 |
| 3,549,313 | 12/1970 | Eckert et al. | 252/384 |

OTHER PUBLICATIONS

Carbowax Polyethylene Glycols, Union Carbide, 1972, pp. 1-3.

*Primary Examiner*—Benjamin R. Padgett
*Assistant Examiner*—Irwin Gluck
*Attorney, Agent, or Firm*—Christie, Parker & Hale

[57] ABSTRACT

A method and composition for forming a thin film of evaporation retarding agent upon a water surface by applying to the water, solid macroscopic particles of a saturated, aliphatic, interface-active hydrocarbon in solid solution with a spreading agent, e.g., a polyethylene glycol, that is soluble in both water and the hydrocarbon. Preferably, the particles are admixed with solid macroscopic particles of a filler material capable of generating a gas upon contact with water and compacted into a tablet, pellet or other solid unitary form for application to a water surface.

12 Claims, No Drawings

METHOD AND COMPOSITION FOR RETARDING WATER EVAPORATION

CROSS REFERENCE TO RELATED APPLICATIONS

This is a division of application Ser. No. 444,827, filed Feb. 22, 1974, now U.S. Pat. No. 4,162,990.

BACKGROUND OF THE INVENTION

This invention relates to water evaporation retardation and, more particularly, to improving the spreadability of evaporation retarding agents.

My U.S. Pat. No. 3,531,239, which issued on Sept. 29, 1970, discloses a method for forming a thin film of an evaporation retarding agent upon a water surface, and a composition which when added to water results in such a film. A solid admixture of the particulate retarding agent, which is a saturated, aliphatic, interface-active hydrocarbon, and a water soluble filler material is applied to the water surface in the form of a compacted unitary solid such as a tablet. The filler material serves to separate the particles of the retarding agent so it spreads more quickly upon contact with the water. Suitable filler materials are usually so dense that the bulk density of the compacted solid is greater than one. To maintain the compacted solid on the surface of the water while the retarding agent spreads, my U.S. Pat. No. 3,531,239 teaches the use of a filler material capable of generating a gas upon contact with water. My patent also teaches that the gas bubbles generated will bring evaporation retarding agents to the surface to form a film even in cases where the tablet itself sinks. A suitable gas generating filler material is sodium bicarbonate and tartaric acid.

In general, the longer the chain length of the hydrocarbon, the more effective is the resulting monomolecular layer as an evaporation retardant, but the slower the layer spreads over the water surface. For example, the smallest chain length that can seriously be regarded as an effective evaporation retardant is $C_{16}$. Even a hydrocarbon with a chain length of $C_{18}$ spreads too slowly to be practical for many purposes when applied alone in the manner described in my above referenced patent, so it normally must be mixed with a $C_{16}$ hydrocarbon to improve the spreadability.

SUMMARY OF THE INVENTION

The invention is directed to a method for forming thin films of evaporation retarding agents upon a water surface. The method comprises the steps of mixing a saturated aliphatic interface-active hydrocarbon with a spreading agent that is both soluble in water and the hydrocarbon to form a solution having a sufficiently small specific gravity to float on water and applying the solution to the water surface. Preferably the hydrocarbon and the spreading agent are separated particles in the solid solution proportioned to have a specific gravity of less than one.

Description of the Preferred Embodiment

The disclosure of my U.S. Pat. No. 3,531,239, which issued Sept. 29, 1970, is incorporated herein by reference. In the preferred embodiment of the present invention, a spreading agent improves the spreadability of long chain, saturated, aliphatic, interface-active hydrocarbons admixed with a filler material in a solid compacted evaporation retardant tablet, pellet, briquette, or other unit. My referenced patent identifies a large number of suitable evaporation retarding hydrocarbons, and states the properties required therefor. Other suitable hydrocarbons are docosanol and docosanoic acid.

The spreading agent is a material that is readily soluble in both water and the evaporation retarding hydrocarbon. In order to apply the evaporation retarding agent to the water in the preferred embodiment of a solid compacted admixture, the spreading agent must be a solid at room or ambient temperature, at least when in solution with the evaporation retarding hydrocarbon.

One very important use of the invention is in evaporation retardant tablets dispensed automatically onto the surface of a swimming pool at regular intervals over a long period of time by the system disclosed in my copending application Ser. No. 444,826, now U.S. Pat. No. 3,918,607, which issued Nov. 11, 1975 filed on even date herewith and entitled CHEMICAL DISPENSING SYSTEM. Unless elaborate and costly measures are taken to keep water vapor out of the dispensing system, the spreading agent must be nonhygroscopic; otherwise, while the tablets are stored in the dispensing system, moisture would dissolve the filler material, release the gas, and prevent satisfactory spreading.

The polyethylene glycol family, a number of members of which are sold commercially by Union Carbide Corporation under the trademark CARBOWAX, is water soluble. The members of the CARBOWAX family are designated by numbers that correspond approximately to their respective molecular weights, i.e., CARBOWAX 600, 1500, 4000, and 6000. This family has a general chemical formula $HOCH_2(CH_2OCH_2)_x CH_2OH$. CARBOWAX 600 and CARBOWAX 1500 are not generally suitable as a spreading agent for a solid, compacted evaporation retardant because they are liquid at room temperature. CARBOWAX 6000 is not generally suitable as a spreading agent because it is not sufficiently soluble in evaporation retarding hydrocarbons. CARBOWAX 4000, which has a molecular weight between 3,000 and 3,700, is a generally suitable spreading agent for all uses including the above described swimming pool dispensing system, because it is soluble in both water and the evaporation retarding hydrocarbons, is nonhygroscopic, and is solid at room temperature.

Although diacetin and triacetin are soluble in both water and the evaporation retarding hydrocarbons, they are not generally suitable spreading agents in the above described swimming pool dispensing system because they are liquid at room temperature and very hygroscopic.

Another important use of the invention is to dispense solid compacted evaporation retardant units onto large natural bodies of water such as lakes and ponds. In such case, diacetin would be a suitable spreading agent if the evaporation retardant units are stored in air tight drums cooled to a temperature below the melting point of the solution of diacetin and the evaporation retarding hydrocarbon. The invention can also be used to dispense on a body of water a solution of spreading agent and evaporation retarding hydrocarbon in liquid form. In such case, triacetin would be a suitable spreading agent.

In the preferred embodiment, the water retarding agent and the spreading agent are melted and mixed to form a liquid solution. The solution is cooled to room temperature, where it is a solid. After the solution solidifies, it is ground to form macroscopic particles. If the particles are too large, the evaporation retarding hydrocarbon will spread too slowly. If the particles are too small, too much of the evaporation retarding hydrocarbon will have to be used to obtain an effective monomolecular layer because the particles will be influenced by convection currents in the water and few will reach the water surface. (These convection currents are apparently caused by concentration gradients from the desolution of salts in the tablets used to apply the retarding agent.) Thus, the upper and lower limits on particle size are governed respectively by the desired spreading speed and the desired economy of evaporation retarding agent. In practice, particles with an average size of one millimeter or less are preferred. It is also preferred to have a wide range of individual particle sizes from the point of view of spreading speed and economy so long as there are not too many particles small enough to be influenced substantially by convection currents. The evaporation retarding hydrocarbons generally have a specific gravity less than one, and CARBOWAX 4000 has a specific gravity greater than one. The evaporation retarding hydrocarbon and spreading agent are preferably mixed in a proportion that results in a solid solution with a specific gravity less than one, so the evaporation retarding hydrocarbon agent is sure to remain on the water surface while the spreading agent is dissolving. Even in cases where the specific gravity is more than one, surface tension will float some of the retarding agent.

In the preferred embodiment, the ground particles of the evaporation retarding hydrocarbon and spreading agent in solid solution are admixed with a water soluble filler material capable of generating a gas upon contact with water. The admixture is compacted into tablets, or pellets, or other solid unitary form for later application to a water surface. The types of filler materials and their proportions are selected to provide the smallest possible bulk density in the compacted admixture. The admixture is compacted to obtain the degree of hardness described in my referenced patent, and a bulk density that does not exceed 1.4. The various filler materials described in my referenced patent may be used.

In a specific example, there was used for a water evaporation retardant in compacted solid unitary form the following formulation by weight percent:

| | |
|---|---|
| Octadecanol | 35.0% |
| CARBOWAX 4000 | 3.5% |
| Sodium carboxymethyl cellulose (CMC) | 16.6% |
| Magnesium stearate | 4.1% |
| Tartaric acid | 18.9% |
| Sodium bicarbonate | 21.9% |

The CMC serves as a water soluble filler material that reduced the bulk density of the resulting solid unit; in Example I of my referenced patent, sucrose performs this function. The magnesium stearate, tartaric acid, and sodium bicarbonate serve the same functions described in my referenced patent.

The octadecanol, which is a solid at room temperature, and the CARBOWAX 4000, which is a solid at room temperature, were placed in a vessel and heated together to a temperature of about 70° C., where they are both in a liquid state. While in a liquid state, the octadecanol and CARBOWAX 4000 were mixed to form a liquid solution. The liquid solution was poured into a shallow pan and permitted to cool to room temperature, thereby forming a solid solution. The solid solution of the octadecanol and CARBOWAX 4000 was ground in a Waring blender, the resulting particles were passed through screening of 10 mesh. The particles of the solid solution were then admixed with the remaining ingredients. The resulting admixture was compacted with a standard tablet forming machine to form tablets having a bulk density of about 1.15. When the tablets were placed upon a water surface, they floated until dissolved. As the tablets disintegrated, the particles of the octadecanol-CARBOWAX solution which broke off from the tablets also floated until the CARBOWAX had dissolved, leaving a thin film of octadecanol spread over the water surface. One of the tablets completely dissolves within a period of about 15 minutes.

The tablets may be stored for long periods of time in the atmosphere without caking, disintegrating, or otherwise becoming unmanageable. They are suitable for use in the swimming pool dispensing system disclosed in my copending application filed on even date herewith.

To summarize, the general characteristics required for the spreading agent are solubility in both water and the evaporation retarding hydrocarbon. In the preferred embodiment where the water retarding agent is applied to a water surface in the form of a solid compacted unit, the spreading agent must also be a solid at room or ambient temperature when in solution with the evaporation retarding hydrocarbon. If the solid compacted unit has a gas generating filler and is stored in a moisture containing environment, the spreading agent must also be nonhygroscopic.

The described embodiment of the invention is only considered to be preferred and illustrative of the inventive concept; the scope of the invention is not to be restricted to such embodiment; other ways of practicing the invention may be devised by one skilled in the art without departing from the spirit and scope of this invention. As an example, a water evaporation retardant could be made by powdering a mixture of macroscopic particles of a saturated aliphatic interface-active hydrocarbon in solid solution with a spreading agent that is soluble in both water and the hydrocarbon. The power could be applied to a water surface in a variety of ways, forming a film to reduce water evaporation. As another example, a liquid solution of the hydrocarbon and spreading agent could be applied to a water surface to obtain the same result.

What is claimed is:

1. A method for forming thin films of evaporation retarding agents upon a water surface, the method comprising the step of applying to the water surface a mixture of separated particles of a saturated aliphatic interface-active hydrocarbon in solid solution with a spreading agent that is soluble in water and in the hydrocarbon, the mixture having a sufficiently small specific gravity to float on water.

2. The method of claim 1, in which the hydrocarbon and the spreading agent are so proportioned that the solid solution has a specific gravity of less than one.

3. The method of claim 1, in which the spreading agent is a polyethylene glycol.

4. The method of claim 3, in which the polyethylene glycol has a molecular weight between 3,000 and 3,700.

5. The method of claim 1, in which the particles are separated by a water soluble filler.

6. The method of claim 5, in which the filler is at least in part a material capable of generating a gas upon contact with water.

7. A method for forming thin films of evaporation reducing agents upon a water surface comprising:
   (a) mixing a saturated aliphatic interface-active hydrocarbon with a spreading agent that is both soluble in water and the hydrocarbon to form a solution having a sufficiently small specific gravity to float on water; and
   (b) applying the solution to the water surface.

8. The method of claim 7, in which the spreading agent is nonhygroscopic.

9. The method of claim 7, in which the spreading agent is a solid at room temperature when in solution with the hydrocarbon.

10. The method of claim 9, in which the solid solution has a specific gravity of less than one.

11. The method of claim 7, in which the spreading agent is a polyethylene glycol.

12. The method of claim 11, in which the polyethylene glycol has a molecular weight between 3,000 and 3,700.

* * * * *